April 20, 1943. F. S. OVERACKER ET AL 2,316,971
MEASURING BOARD AND CUTOFF STOPS
Filed April 26, 1940
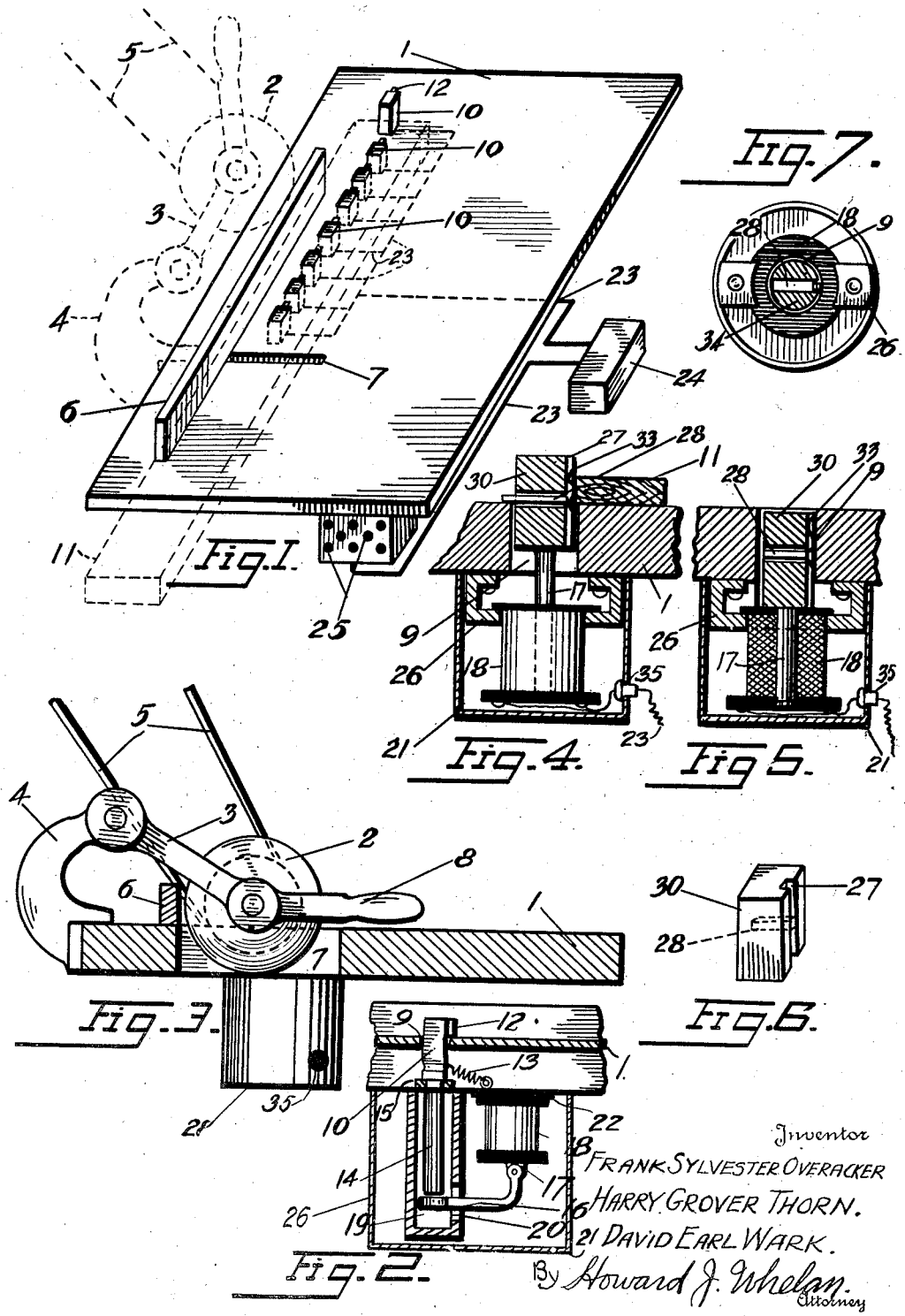
Inventor
FRANK SYLVESTER OVERACKER
HARRY GROVER THORN.
DAVID EARL WARK.
By Howard J. Whelan
Attorney Patented Apr. 20, 1943

2,316,971

UNITED STATES PATENT OFFICE 2,316,971

MEASURING BOARD AND CUTOFF STOP

Frank Sylvester Overacker, Harry Grover Thorn, and David Earl Wark, Klickitat, Wash.

Application April 26, 1940, Serial No. 331,712

1 Claim. (Cl. 143—168)

This invention refers to measuring tables or boards for sawing and cutting machinery used particularly in the cutting of lumber, timber and other materials, and particularly to arrangements for automatically setting the stop-blocks that control the length of the material to be cut. It has among its objects to provide a special kind of gauge or stop block that can be set electrically remotely from the same; which will be automatic as far as staying in position while the material is being cut in the machine. Another object is to have the device as simple in structure as feasible and which will not require much room comparatively on the table, and when placed will be out of the way of the material being cut. A further object is to provide for speedy operation of the stop-blocks and a cooperatively working saw mechanism for cutting the material attachable to the table.

Other objects will become apparent as the invention is set forth in the specification and drawing.

The conventional forms of gauge or stop blocks require placement by hand and somewhat tedious methods for their accurate adjustment on the saw tables. The process is slow and its accuracy of results depends greatly on the care that the worker devotes to it. In this invention, the blocks are set as accurately as possible and with such frequency and relative positions as the work may need. They are operated through the use of magnetic coils mounted out of the way underneath the table, energized by a circuit and push-button control close to the operator. The blocks are so made that they are held in place to the table above its surface when the material to be cut is pressed against them. This is provided for through the use of a peg or bolt in the block connected with a flat spring that the lumber or timber pressing against same will move the peg to rest on the table and prevent the block from falling back under the action of gravity, when the push-button is released by the operator.

In the drawing which illustrates an example of this invention:

Figure 1 is a view in perspective of a saw table with gauge blocks embodying this invention. The dotted outline indicates the relative position of the saw mechanism used with the table.

Figure 2 is a sectional detail through the gauge block and mechanism mounted on the table.

Figure 3 is a side elevational detail of the saw mechanism mounted on the table.

Figure 4 is a sectional detail of a modified form of block and mechanism, in operative position.

Figure 5 is a sectional detail, including a section through the coils, of the form shown in Figure 4 with the gauge block in normal position.

Figure 6 is a perspective detail of the block used in Figures 4 and 5.

Figure 7 is a plan view of a similar form of block and mechanism partly in section, the block being of cylindrical form and with a bolt or peg passing through same transversely to lock the block on the upper surface of the table.

Similar reference characters refer to similar parts throughout the drawing.

In the construction shown in the drawing, 1 represents a table or work bench over which a movable saw 2 swings to cut the material placed upon it. The saw is supported by an arm 3 hinged to a bracket 4, preferably attached to the side edge of the table 1. The saw is operated through a belt drive 5 connected in a conventional manner with a driving pulley, not shown in the drawing. The table is preferably provided with an adjustable guide bar 6 mounted suitably on the working surface of the table and for guiding the work to be cut to the saw. A slot 7 is arranged in the table for the saw to operate in as it cuts through the material. The position of the handle 8 of the saw mechanism serves to limit the travel of the saw so it will not cut the table.

The table is recessed with openings 9 to permit gauge blocks 10 to operate in readily, and at the same measure off the table for the placement of the wood or material to be cut thereon. The material is indicated at 11. Each gauge block has a projecting lug 12 which rests on the upper surface of the table when it is raised to operating position. The block is pulled over by a spring 13 and thereby forces it to catch and lock itself on the table. The gauge block is mounted on a yoke 14 guided in through a collar 15 attached to the under side of the table and is raised and lowered in a vertical line of travel. An arm 16 raised and lowered through the operation of the core 17 in a magnet coil 18 raises the yoke 14. A casing 19 serves to protect the yoke 14 and with its slot 20 to limit the travel of the arm 16. An outer casing 21 protects the whole mechanism. The coil is attached to the under side of the table through a bracket 22. The gauge block is in its correct measuring position, when it locks to the table by its lug 12. The block is struck backwards to release the lug and allow the block to return to its normal position. The number of gauge blocks used is predetermined by the user. Only one block is utilized for a particular cut, at a time.

The coils 18 are energized through circuits 23 supplied from a source of current 24 and controlled by pushbuttons 25 mounted on a suitable board adjacent to the position held by the operator. The operator presses the respective pushbutton that measures off the material to be cut. The material is then pushed up against it, after which the saw is brought down to cut it through. The block raised by the pushbutton locks itself on the table through the catching of the lug 12 and sets itself in position for the timber or other material to be cut, to be located against it.

In the form of structure indicated in Figures 4, 5 and 6, the coil 18 is mounted on a bracket 26 attached to the under side of the table 1. The core 17 of the coil 18 connects with a special gauge block 30 that moves in a similar opening 9 in the table as in the other form. It is projected above the table as noted in Figure 4 from its normal position, indicated in Figure 5. The block has a groove 27 facing the side against which the timber is brought, and in this groove is placed a flat spring 33, which is bent to project out when the gauge block is raised. This bent portion is pressed against by the timber to be cut and forced back into the groove, causing a bolt or peg 28 in a transverse passage in the block to project out from the other side and rest on the upper surface of the table. This locks the block on the table while the timber or material is pressed against the spring. After the timber is cut and removed from the block mentioned, the peg or bolt returns into the block and the latter falls back to normal position under its weight and that of the core.

In Figure 7, the block is similar to that shown in Figures 4 and 5, except that its section is circular instead of being rectangular as in the other forms. The block is indicated at 34 and its peg or bolt and passages by similar reference characters to those used in the forms outlined in Figures 4 and 5.

Figure 6 indicates the general construction of the gauge block used in Figures 4 and 5.

An outer casing is used about the coil units to protect them against injury and the dust flying around the device. An insulator 35 is provided in its wall for the passage of the circuit wires 23 therethrough, and connections provide an arrangement for the attachment of the wires of the coils to the circuits.

While the forms in which the invention is shown are limited in number, it is not desired to limit the application for patent to such forms or in any other way, otherwise than limited by the principles and claim disclosed herewith.

Having thus described the invention what is claimed is:

A cutting table of the class described comprising in combination, a table having a plurality of rectangular holes transversely therethrough, a plurality of gauge rectangular blocks mounted on the table and operating vertically in said holes in predetermined and restricted alignment, for providing a measuring means with a straight flat contact surface for the material to be cut on the table, a plurality of coils for operating the blocks in one direction, circuit means for controlling the operation of the coils and blocks and a pin operating through each of the blocks transversely between two of its faces to hold the gauge block above the surface of the table when the material to be cut is moved against one of these faces and projects the pin through the block to so hold the block.

FRANK SYLVESTER OVERACKER.
HARRY GROVER THORN.
DAVID EARL WARK.